(12) United States Patent
Sennoun

(10) Patent No.: US 11,156,984 B2
(45) Date of Patent: Oct. 26, 2021

(54) PARALLELIZED CAD USING MULTI BEAM ADDITIVE PRINTING

(71) Applicant: General Electric Company, Schenectady, NY (US)

(72) Inventor: Mohammed El Hacin Sennoun, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/394,475

(22) Filed: Apr. 25, 2019

(65) Prior Publication Data

US 2019/0250589 A1 Aug. 15, 2019

Related U.S. Application Data

(63) Continuation of application No. 15/446,764, filed on Mar. 1, 2017, now Pat. No. 10,317,881.

(51) Int. Cl.
 *G05B 19/4099* (2006.01)
 *B33Y 50/02* (2015.01)

(52) U.S. Cl.
 CPC .......... *G05B 19/4099* (2013.01); *B33Y 50/02* (2014.12); *G05B 2219/35134* (2013.01); *G05B 2219/49007* (2013.01); *Y02P 10/25* (2015.11)

(58) Field of Classification Search
 CPC ................ B33Y 50/02; G05B 19/4099; G05B 2219/35134; G05B 2219/49007; Y02P 10/25; Y02P 10/295; Y02P 90/02
 USPC .......................................................... 700/98
 See application file for complete search history.

(56) References Cited

U.S. PATENT DOCUMENTS

| | | | |
|---|---|---|---|
| 2,046,458 A | 7/1936 | Johnson | |
| 3,428,278 A | 2/1969 | Glaze | |
| 3,833,695 A | 9/1974 | Vidal | |
| 5,184,507 A | 2/1993 | Drake | |
| 9,878,495 B2 * | 1/2018 | Douglas | B33Y 50/02 |
| 9,956,612 B1 | 5/2018 | Redding et al. | |

(Continued)

FOREIGN PATENT DOCUMENTS

| CN | 105235212 A | 1/2016 |
|---|---|---|
| CN | 105665701 A | 6/2016 |

(Continued)

OTHER PUBLICATIONS

International Search Report Corresponding to PCT Application No. PCT/US2018/014018 dated May 10, 2018.

(Continued)

*Primary Examiner* — Chun Cao
(74) *Attorney, Agent, or Firm* — Dority & Manning, P.A.

(57) ABSTRACT

The present disclosure generally relates to additive manufacturing or printing of an object using parallel processing of files comprising 3D models of the object and/or portions thereof. A master file comprising a 3D model of the object is divided into subordinate files, wherein each subordinate file comprises a 3D model of a corresponding portion of the object. Each subordinate file is processed in parallel, controlling at least a first laser source to fabricate each portion from a build material. Parallel processing according to the methods of the present disclosure expedites additive manufacturing or printing over conventional methods that build an object in layers completed in series.

19 Claims, 10 Drawing Sheets

(56) References Cited

U.S. PATENT DOCUMENTS

| | | |
|---|---|---|
| 10,022,794 B1 | 7/2018 | Redding et al. |
| 10,022,795 B1 | 7/2018 | Redding et al. |
| 10,040,275 B2 | 8/2018 | Lu et al. |
| 2001/0033281 A1 | 10/2001 | Yoshida et al. |
| 2013/0112672 A1 | 5/2013 | Keremes et al. |
| 2014/0023996 A1 | 1/2014 | Finn et al. |
| 2014/0074274 A1* | 3/2014 | Douglas ............... B29C 64/393 700/105 |
| 2014/0268604 A1 | 9/2014 | Wicker et al. |
| 2016/0089754 A1 | 3/2016 | Luo et al. |
| 2016/0090842 A1 | 3/2016 | Luo et al. |
| 2016/0114432 A1 | 4/2016 | Ferrar et al. |
| 2016/0176117 A1 | 6/2016 | Lee et al. |
| 2016/0207220 A1 | 7/2016 | Hack et al. |
| 2016/0318129 A1 | 11/2016 | Hu |
| 2016/0332385 A1 | 11/2016 | Choi et al. |
| 2017/0021454 A1* | 1/2017 | Dallarosa ............... B33Y 30/00 |
| 2017/0032561 A1 | 2/2017 | Choi et al. |
| 2017/0157858 A1 | 6/2017 | Lee |
| 2017/0246810 A1 | 8/2017 | Gold |
| 2017/0333991 A1 | 11/2017 | Kanai |
| 2018/0043634 A1 | 2/2018 | Sands et al. |
| 2018/0268091 A1* | 9/2018 | Arisoy ................. G06T 17/005 |

FOREIGN PATENT DOCUMENTS

| | | |
|---|---|---|
| EP | 2875897 B1 | 1/2016 |
| GB | 2503537 A | 1/2014 |
| JP | 2006/506249 A | 2/2006 |
| JP | 2016/505709 A | 2/2016 |
| JP | 2016/528374 A | 9/2016 |
| JP | 2017/500233 A | 1/2017 |
| JP | 2017/532204 A | 11/2017 |
| WO | WO03/016031 A1 | 2/2003 |
| WO | WO2015/091485 A1 | 6/2015 |
| WO | WO2015/191257 A1 | 12/2015 |

OTHER PUBLICATIONS

EOS, Leader in e-Manufacturing Solutions, Corporate Presentation Sep. 2014.

Machine Translated Japanese Search Report Corresponding to Application No. 2019547406 dated Sep. 2, 2020.

Kerbrat et al., "A new DFM approach to combine machining and additive manufacturing", Computers in Industry, vol. 62, No. 7, Amsterdam, Apr. 7, 2011, pp. 684-692.

* cited by examiner

PARALLELIZED CAD USING MULTI BEAM ADDITIVE PRINTING

CROSS-REFERENCE TO RELATED APPLICATIONS

This application is a continuation of and claims the benefit of priority to U.S. patent application Ser. No. 15/446,764, filed Mar. 1, 2017, which is hereby incorporated by reference in its entirety.

The present disclosure generally relates to methods, such as direct metal laser melting (DMLM), and systems for additive manufacturing or printing using parallel processing of multiple subordinate files, each comprising a 3D model of a portion of an object to be built, derived from a master file comprising a 3D model of the whole object. The methods and systems of the present disclosure can be used to make various 3D printed objects from a variety of materials including metals, ceramics and/or plastics.

BACKGROUND

Additive manufacturing (AM) or additive printing processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a 3D model, such as a computer aided design (CAD) model. A particular type of AM process uses electromagnetic radiation such as a laser beam, to solidify or cure a liquid photopolymer, creating a solid three-dimensional object.

Processes such as direct metal laser melting (DMLM), selective laser melting (SLM), and digital light processing (DLP) have been used to produce objects for a variety of industries. A schematic of conventional computer-aided design (CAD)-assisted additive printing is shown in FIG. 1. A single CAD file 101 is processed by a computer 102, which directs or controls printing of the object defined in the CAD file 101 by printing machine 103. The object may be fabricated or manufactured one layer at a time, in either a top-down or bottom-up fashion, depending on the specific apparatus and/or method used. For example, as described in U.S. Pat. No. 5,184,507, a stereolithography system will typically form a three-dimensional part in accordance with a corresponding object representation, which representation may be formed in a CAD system or the like. Before such a representation can be used, however, it must be sliced into a plurality of layer representations. The stereolithography system will then, in the course of building up the object in a stepwise layer-by-layer manner, selectively expose the untransformed layers of material in accordance with the layer representations to form the object layers, and thus, the object itself. The larger or more complex the object to be built, the longer this process will generally take; accordingly, such processes can become unacceptably long for manufacturing large objects. Thus, it is desirable to expedite additive manufacturing.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In one aspect, the present disclosure relates to a method of fabricating an object. The method comprises dividing a master file comprising a 3D model of the object to be fabricated into subordinate files, and processing each of the subordinate files to form a corresponding portion of the object. In one embodiment, the master file may be an .STL file corresponding to the 3D model. In this case the STL file is divided into subordinate STL files. In another embodiment, the master file is g-code, which is generated from the STL file using a slicer program. The g-code contains the machine instructions for operating the 3D printer to produce the object corresponding to the 3D model. In this case the master file contains g-code and is broken down into subordinate files containing g-code corresponding to 3D models of a portion of the object.

Each subordinate file comprises a 3D model of a corresponding portion of the object. Processing comprises, for each subordinate file, controlling at least a first laser, to fabricate the corresponding portion; processing of each subordinate file is carried out in parallel. In some aspects, processing comprises controlling at least two lasers, using a first subordinate file, to fabricate the corresponding portion. In some aspects, the at least two lasers emit different wavelengths of light. In some aspects, the at least two lasers emit different powers. In some aspects, the build material is cobalt-chrome. In some aspects, the master file is divided into two or more subordinate files. In some aspects, the master file is divided into four or more subordinate files. In some aspects, the master file is divided into ten or more subordinate files.

In another aspect, the present disclosure relates to a system for fabricating an object according to a master file comprising a 3D model of the object. The system comprises a memory and at least one processor coupled with the memory and configured to divide the master file into corresponding subordinate files. Each subordinate file comprises a 3D model of a corresponding portion of the object. The processor is further configured to process each of the subordinate files to form a corresponding portion of the object. Processing comprises, for each subordinate file, controlling at least a first laser, to fabricate a corresponding portion. Processing of each subordinate file is carried out in parallel. In some aspects, processing comprises controlling at least two lasers, using a first subordinate file, to fabricate the corresponding portion. In some aspects, the at least two lasers emit different wavelengths of light. In some aspects, the at least two lasers emit different powers. In some aspects, the system further comprises one or more containers to hold one or more build materials. In some aspects, the build material is cobalt chrome. In some aspects, the processor may process two or more subordinate files. In some aspects, the processor may process four or more subordinate files. In some aspects, the processor may process ten or more subordinate files.

In another aspect, the present disclosure relates to a method of fabricating an object using direct metal laser melting (DMLM). The method comprises dividing a master file comprising a 3D model of the object to be fabricated into corresponding subordinate files, and processing each of the subordinate files to form a corresponding portion of the object. Each subordinate file comprises a 3D model of a corresponding portion of the object. Processing each of the subordinate files comprises, for each subordinate file, controlling at least a first laser, to fabricate a corresponding portion. Processing of each subordinate file is carried out in parallel. In some aspects, processing comprises controlling at least two lasers, using a first subordinate file, to fabricate the corresponding portion. In some aspects, the at least two lasers emit different wavelengths of light. In some aspects, the at least two lasers emit different powers.

In another aspect, the present disclosure relates to a non-transitory computer-readable storage medium storing executable code for wireless communications, comprising code for a master file comprising a 3D model of an object to be built, dividing the master file into subordinate files, and processing each of the subordinate files to form a corresponding portion of the object, with each subordinate file comprising a 3D model of defining a corresponding portion of the object. Processing comprises, for each subordinate file, controlling at least a first laser, to fabricate the corresponding portion. Processing of each subordinate file is carried out in parallel. In some aspects, processing comprises controlling at least two lasers, using a subordinate file, to fabricate the corresponding portion.

These and other aspects of the invention will become more fully understood upon a review of the detailed description, which follows.

DETAILED DESCRIPTION

Figure 1:
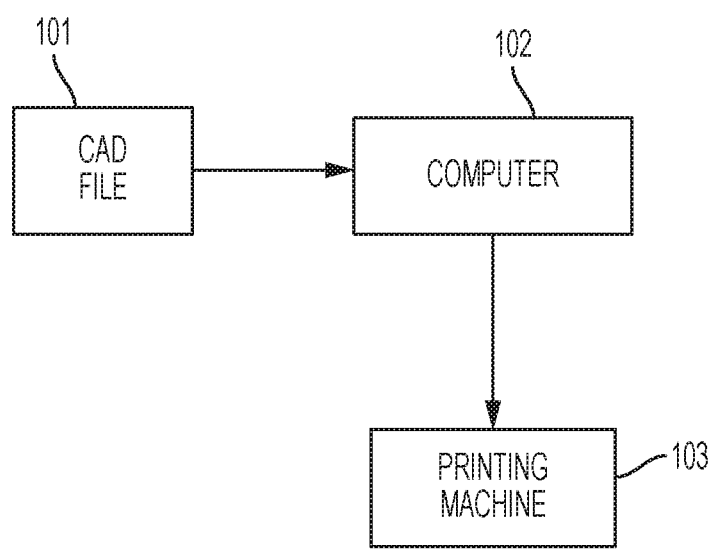
FIG. 1 shows a schematic block diagram of a system for of additive printing according to conventional methods.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts The present application is directed to manufacturing objects using 3D model-assisted additive printing, where a master file comprising a 3D model of the object to be fabricated can be divided into subordinate files, each comprising a 3D model of a corresponding portion of the object, which can be processed in parallel to build corresponding portions of the object in parallel, using at least a first energy source for each subordinate file. In one embodiment, the master file may be an .STL file corresponding to the 3D model. In this case the STL file is divided into subordinate STL files. In another embodiment, the master file is g-code, which is generated from the STL file using a slicer program. The g-code contains the machine instructions for operating the 3D printer to produce the object corresponding to the 3D model. In this case the master file contains g-code and is broken down into subordinate files containing g-code corresponding to 3D models of a portion of the object.

Such methods differ from conventional CAD-assisted additive printing methods by dividing a master file into subordinate files, processing the subordinate files in parallel, and using at least one laser per subordinate file to form one or more portions of an object. As a result, such methods offer the potential to increase manufacturing speed and data organization, especially for larger objects. For example, as the object size increases the number of data inputs will increase and need to be organized. Furthermore, as the focus of AM shifts to making finished products additional information inputs may be utilized to optimize finished part quality. For example, U.S. patent application Ser. No. 15/053,881, filed Feb. 25, 2016 entitled "Multivariate Statistical Process Control of Laser Powder Bed Additive Manufacturing," which is incorporated by reference herein, discloses recording signals of two or more process parameters the process parameters, transforming two or more recorded signals into a reduced variable signal for the recorded process parameters; determining whether the reduced variable signal is within control limits for the process; and generating an alert signal when the reduced variable signals exceed the control limits. The process parameters include for example laser power, laser power drive signal, x/y position of laser focus on build surface, laser scan speed, laser scan direction, on-axis electromagnetic emission from the melt pool, on-axis electromagnetic emission from the plasma, melt pool size, off-axis electromagnetic emission from melt pool, off-axis electromagnetic emission from plasma, incidence angle of laser relative to build surface, incidence angle of laser relative to workpiece, gas flow velocity, powder bed temperature, powder layer thickness, or the thermal conductive properties of workpiece below a given layer/location Additional data processing can be required as a means for optimizing the 3D printing process for producing fine feature detail. For example, U.S. patent application Ser. No. 15/236,102 entitled "Methods for Fine Feature Detail for Additive Manufacturing," which is incorporated by reference herein, discloses methods of increasing the fidelity of a 3D printed part to the 3D model. The process include determining a build layer thickness of an additive manufacturing apparatus; identifying a feature of the part within the model; determining that the feature is not aligned along the z-axis based on the build layer thickness; and moving the feature within the model along the z-axis by a feature offset such that the features is aligned along the z-axis. The present invention can help with the use of data processing steps such as those described herein to be used for 3D printing.

The master file comprises a 3D model of the object to be fabricated, and according to the present disclosure, the master file is divided into subordinate files. For example, a first subordinate file comprises a 3D model of a first portion of the object, and a second subordinate file comprises a 3D model of a second portion of the object. Each subordinate file is then processed, in parallel, to fabricate each portion of the object. In one or more aspects, the master file is divided into multiple subordinate files, where the multiple subordinate files are two or more subordinate files. The present invention is capable of implementation in any additive manufacturing process. In one embodiment, the additive process is direct metal laser melting (DMLM) or direct metal laser sintering (DMLS). In the case of DMLM, the material can be cobalt-chrome or any material suitable for use in a DMLM process.

As used herein, "parallel" processing of the subordinate files means that multiple subordinate files are processed separately and at about the same time, as compared to being processed in sequence, one after another.

As used herein, "different lasers" refer to two or more separate and distinct laser devices and their corresponding laser beams. In some aspects, different lasers may optionally differ in wavelength, power, intensity, and/or other properties of the energy emitted. In some aspects, different lasers may have the same wavelength, power, intensity, and/or other properties of the energy emitted.

As used herein, a "3D model of an object" or portion thereof to be built or fabricated refers to digitized 3D information spatially defining an object or portion thereof 3D models suitable for use with the present invention include, but are not limited to, CAD files and STL files. 3D models may be in vector format and/or may be sliced.

Figure 2:
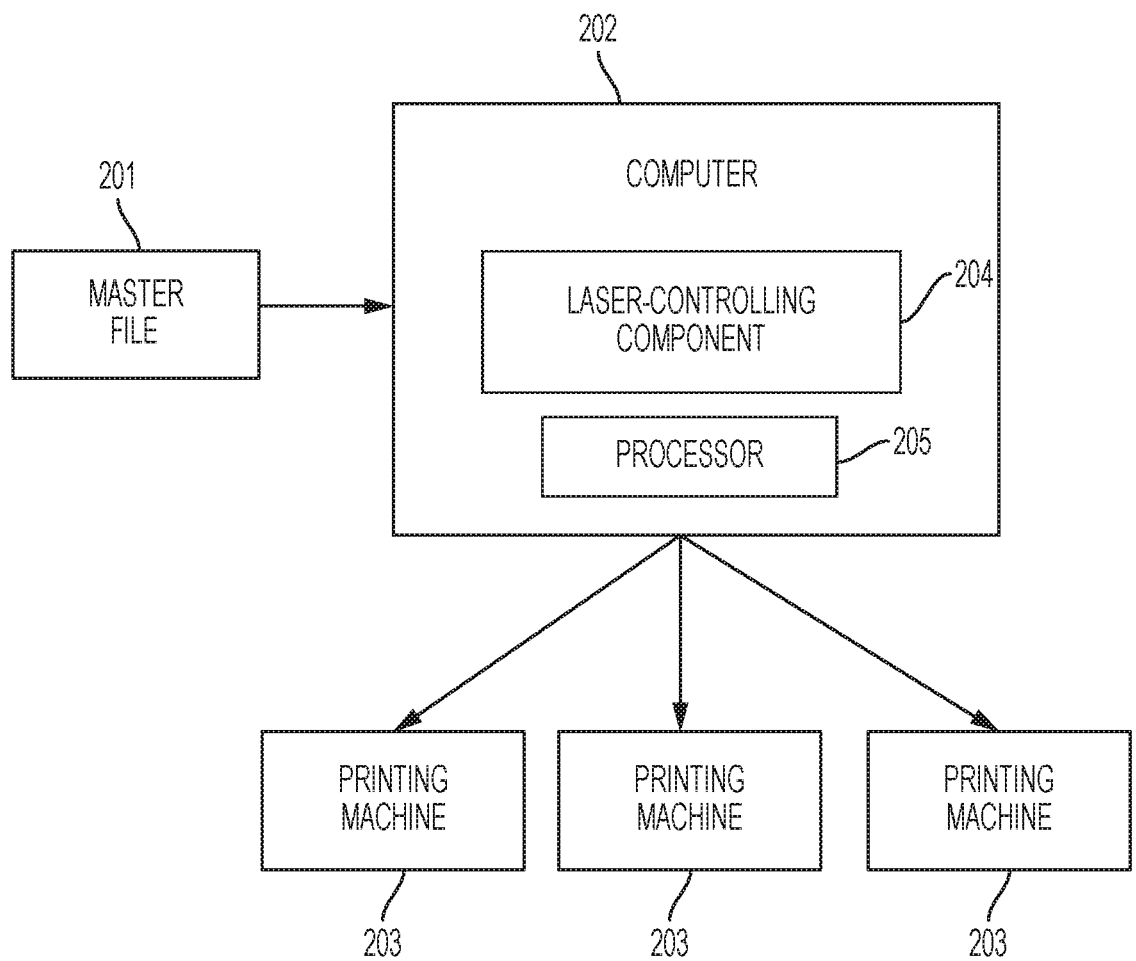
FIG. 2 shows a schematic block diagram of a system for additive printing according to the present disclosure.

FIG. 2 shows a schematic block diagram of additive printing according to the present disclosure. A computer 202 receives a master file 201 comprising a 3D model of an object to be fabricated. The computer 202 may comprise a laser controller component 204 and a processor 205. The computer 202, the laser controller component 204, and/or the processor 205 divide up the master file 201 into multiple subordinate files, wherein each subordinate file comprises a 3D model of a corresponding portion of the object to be fabricated. Each subordinate file is sent to a separate printing machine 203 for processing and printing in parallel. In some embodiments, the master file 201 may be divided into subordinate files before being received by the computer 202. In some embodiments, the same subordinate file may be sent to multiple printers.

Figure 3:
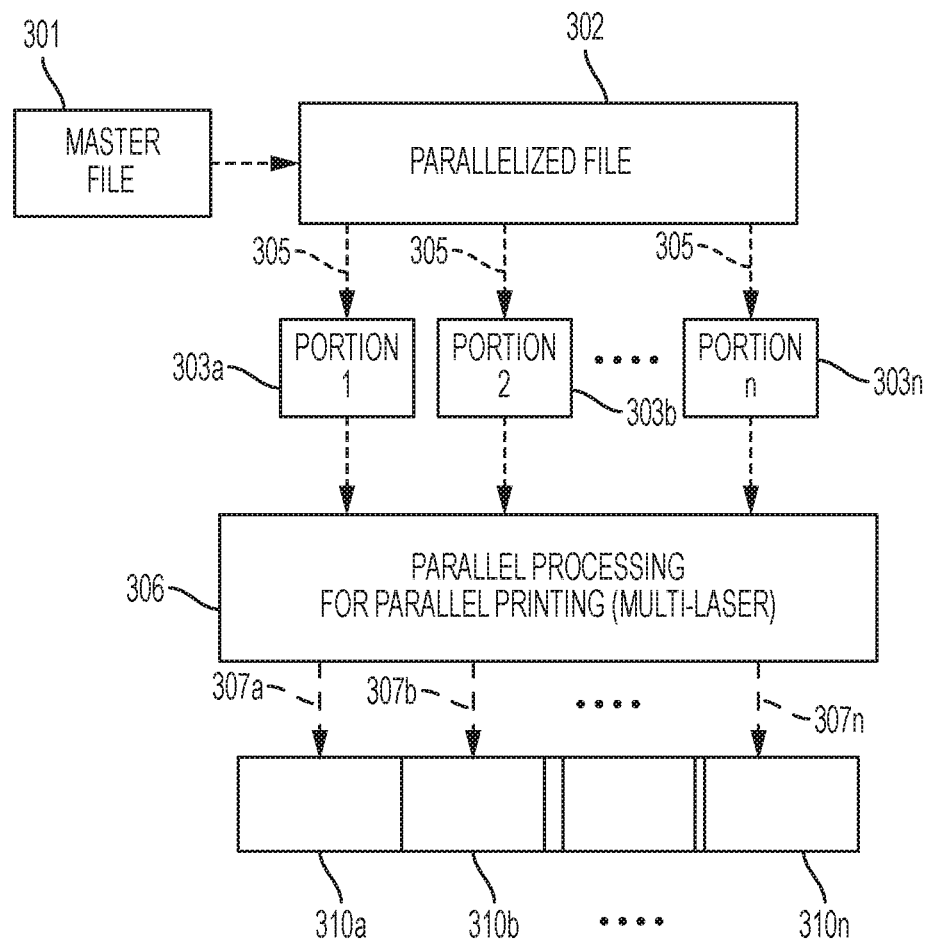
FIG. 3 shows a schematic block diagram of dividing up a master file comprising a 3D model of an object to be built into subordinate files, each comprising a 3D model of a portion of the object, for parallel processing and printing of portions corresponding to each subordinate file.
Figure 4:
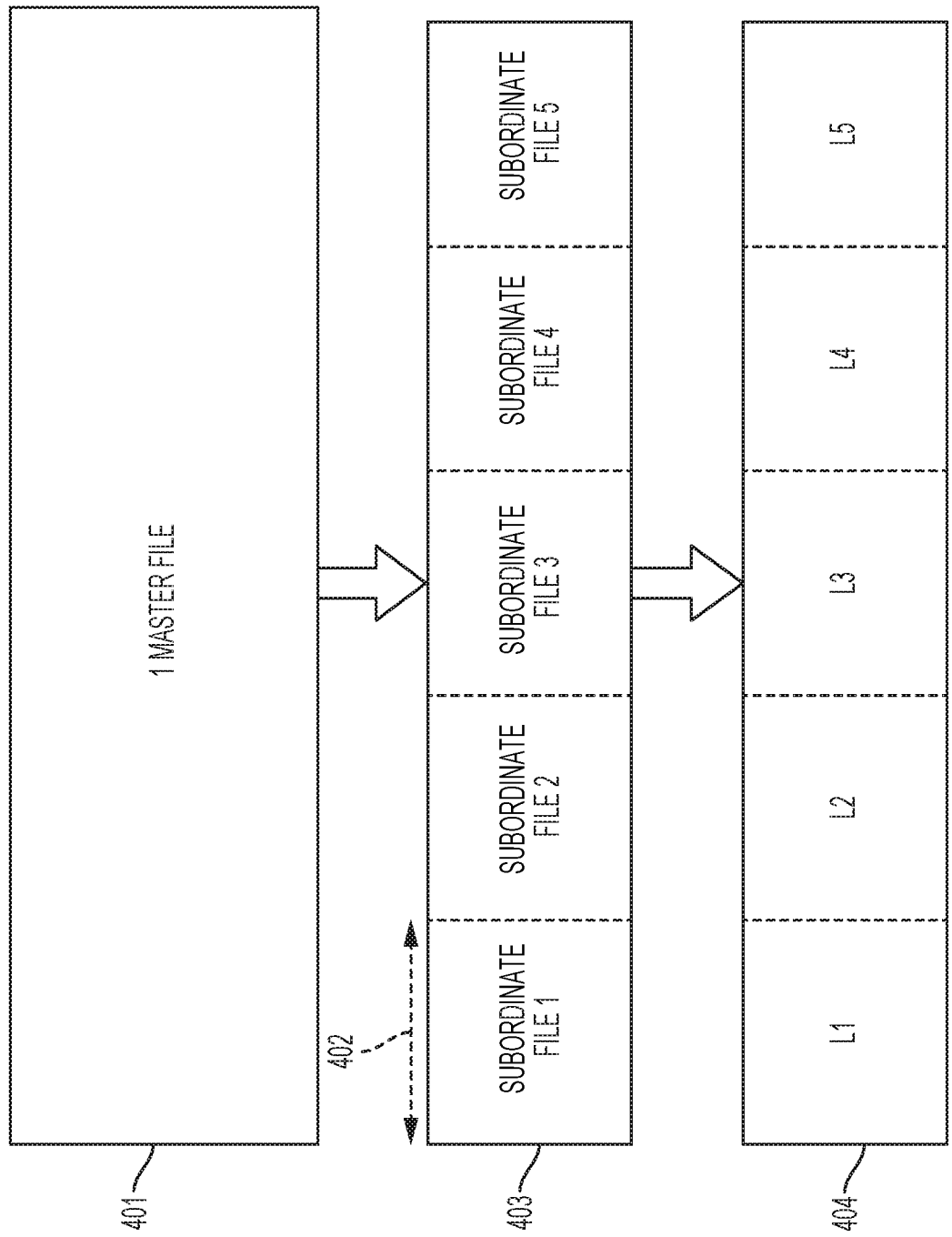
FIG. 4 shows a schematic block diagram of dividing up a master file according to the present disclosure.

FIGS. 3 and 4 show schematic block diagrams of dividing up a master file according to the present disclosure. As shown in FIG. 3, the file dividing component 305 can break or divide the file into two or more files. For example, a master file 301 comprising a 3D model of an object is divided into subordinate files comprising 3D models of portions 1, 2, . . . n shown as 303a, 303b, . . . 303n, respectively, of the object, wherein n is greater than or equal to 2. Portions 1-n (303a-303n) are processed in parallel by processor 306 controlling at least n lasers 307a, 307b, . . . 307n. In some embodiments, the processor 306 does all of the processing. In some embodiments, a single processor 306 may have multiple cores that process subordinate files in parallel. In some embodiments, a main processor controls multiple other processors in one or more printers, with each of the processors interacting with a laser controller which controls a corresponding laser. In some embodiments, the laser controllers are separate. In some embodiments, one laser controller controls multiple lasers. FIG. 3 shows processor 306 controlling laser 307a to fabricate portion 310a using subordinate file 303a, controlling laser 307b to fabricate portion 310b using subordinate file 303b, and controlling laser 307n to fabricate portion 310n using subordinate file 303n. In some embodiments, more than one laser is used to fabricate a given portion of the object to be fabricated.

In FIG. 4, master file 401 is divided into five subordinate files 1-5 (shown collectively as 403) which define subcomponents L1-L5 (shown collectively as 404). The size of the subordinate file 1 is shown as 402. In some embodiments, the subordinate files may each be of equal and/or different sizes.

In some embodiments, the size 402 of the subordinate file 1 may be equal to the maximum size that may be processed with conventional additive printing methods and/or apparatuses. In some embodiments, the size 402 of the subordinate file 1 may be smaller than the maximum size that may be processed with conventional additive printing methods and/or apparatuses.

Figure 5A:
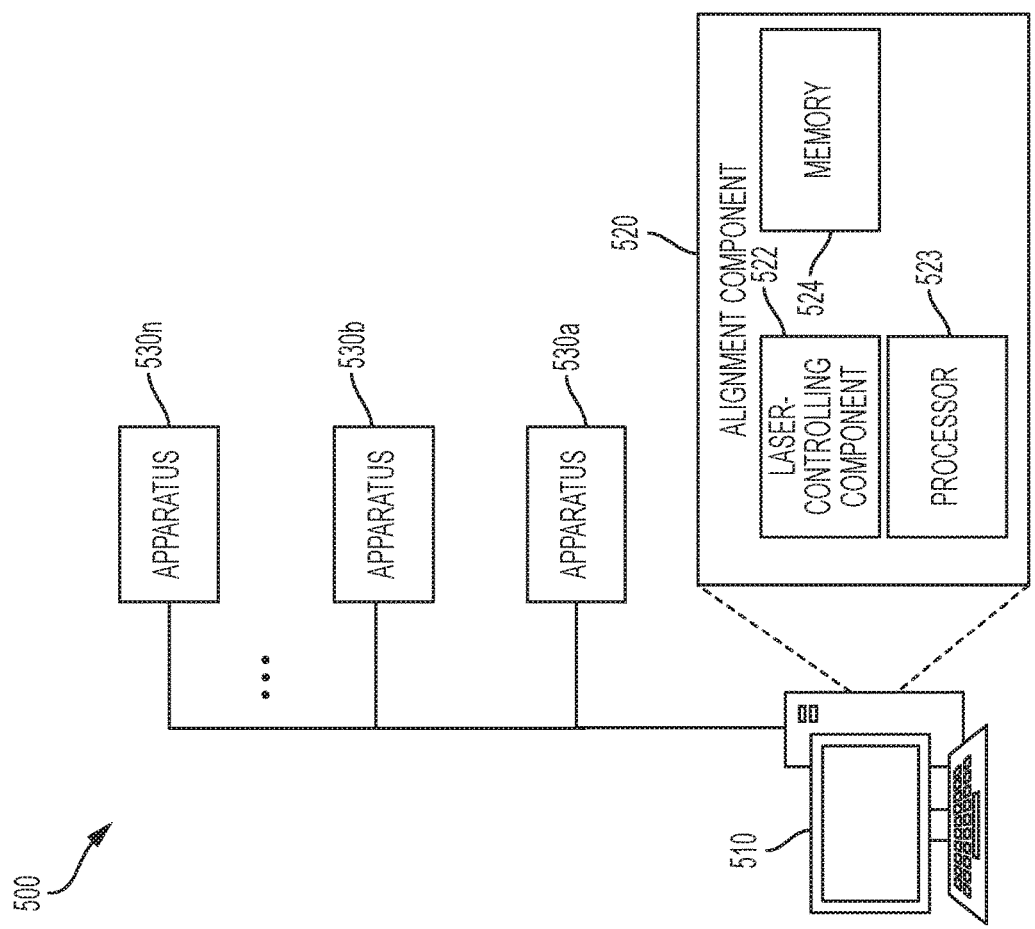
FIG. 5A shows an example of a computer-containing system for carrying out the methods of the present disclosure.

FIG. 5A is a conceptual diagram showing components of an exemplary additive manufacturing system 500 according to an aspect of the disclosure. In an aspect, the additive manufacturing system 500 may be a DMLM system that includes various components of an additive manufacturing apparatus 530. According to the present invention, the additive manufacturing system 500 contains two or more apparatuses 530 (shown as 530a, 530b, . . . 530n).

The additive manufacturing system 500 also includes a computer 510. The computer 510 may be a separate computer or may be integrated with the above components of the additive manufacturing system 500. The computer 510 may include a digital processor communicatively coupled to a computer-readable medium such as a random access memory and/or hard drive. The computer-readable medium may store computer executable instructions that are executed by the processor to control the additive manufacturing system 500. In an aspect, the computer executable instructions are firmware for controlling the additive manufacturing system 500. In another aspect, the computer executable instructions include a 3D model-reading program and/or a standalone program for performing the techniques disclosed herein.

The computer 510 includes an alignment component 520. In an aspect, the alignment component 520 is a processor configured to execute computer executable instructions stored on a computer-readable storage medium. The alignment component 520 includes a laser-controlling component 522 that is configured to control one or more lasers for forming the object and portions thereof according to a master file comprising a 3D model of the object and/or one or more corresponding subordinate files each comprising a 3D model of a portion of the object. The alignment component 520 also includes a processor 523, which may be configured to process a master file and divide it up into subordinate files. The alignment component 520 also includes a slicing component (not shown) that is configured to generate layer representations of an object or portion thereof according to a slicing algorithm. For example, the slicing algorithm may average the portions of the object in a top slice and a bottom slice to determine the boundaries of the layer representation between the slices. The alignment component also includes an adjustment component (not shown) which may be configured to analyze a received 3D model of an object or portion thereof and adjust the position of one or more features in the z-dimension to align the features. The alignment component 520 may include a memory 524 storing a build layer thickness, a scaling factor, a master file comprising a 3D model of the object, and instructions for dividing up the master file into subordinate files each comprising a 3D model of a corresponding portion of the object.

Figure 5B:
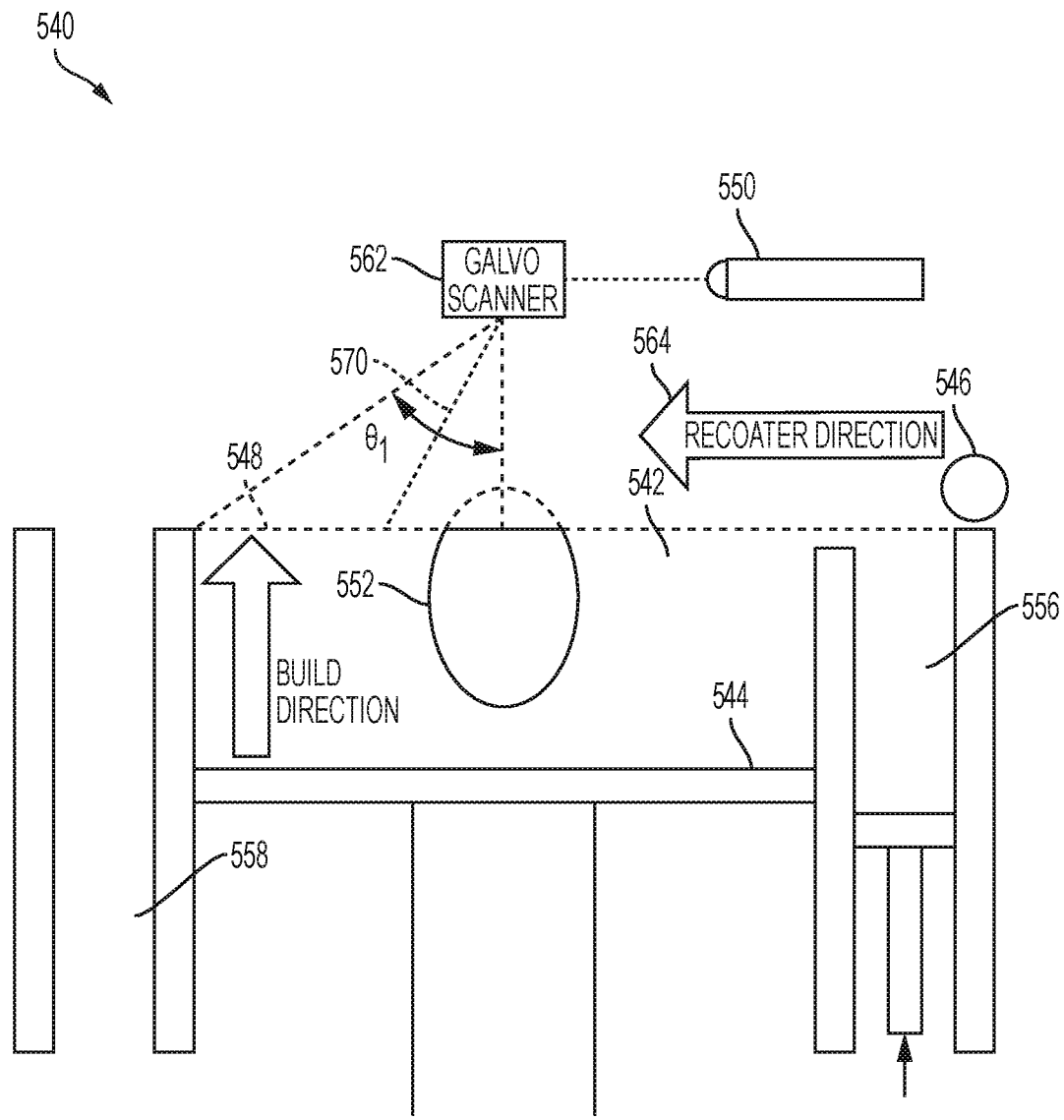
FIG. 5B shows an example of an apparatus for carrying out some aspects of the present disclosure.

In some aspects, one or more of the additive manufacturing apparatuses 530 (shown in FIG. 5A as 530a, 530b, . . . 530n) may comprise an apparatus 540 as shown in FIG. 5B. The apparatus 540 builds portions of objects, for example, the portion 552, in a layer-by-layer manner by sintering or melting a powder material (not shown) using an energy beam 570 generated by a source 550, which can be, for example, a laser for producing a laser beam, or a filament that emits electrons when a current flows through it. The powder to be melted by the energy beam is supplied by reservoir 556 and spread evenly over a powder bed 542 using a recoater arm 546 travelling in direction 564 to maintain the powder at a level 548 and remove excess powder material extending above the powder level 548 to waste container 558. The energy beam 570 sinters or melts a cross sectional layer of the portion of the object being built under control of an irradiation emission directing device, such as a galvo scanner 562. The galvo scanner 562 may comprise, for example, a plurality of movable mirrors or scanning lenses. The speed at which the laser is scanned is a critical controllable process parameter, impacting how long the laser power is applied to a particular spot. Typical laser scan speeds are on the order of 10 to 100 millimeters per second. The build platform 544 is lowered and another layer of powder is spread over the powder bed and object portion being built, followed by successive melting/sintering of the powder by the laser 550. The powder layer is typically, for example, 10 to 100 microns in thickness. The process is repeated until the portion 552 is completely built up from the melted/sintered powder material. The laser 550 may be controlled by a computer system including a processor and a memory (e.g., computer 510 and/or controlling component 522). The computer system may determine a scan pattern for each layer and control laser 550 to irradiate the powder material according to the scan pattern. After fabrication of the object portion 552 is complete, various post-processing procedures may be applied to the object portion 552. Post processing procedures include removal of excess powder by, for example, blowing or vacuuming. Other post processing procedures include a stress release process. Additionally, thermal and chemical post processing procedures can be used to finish the object portion 552.

Figure 5C:
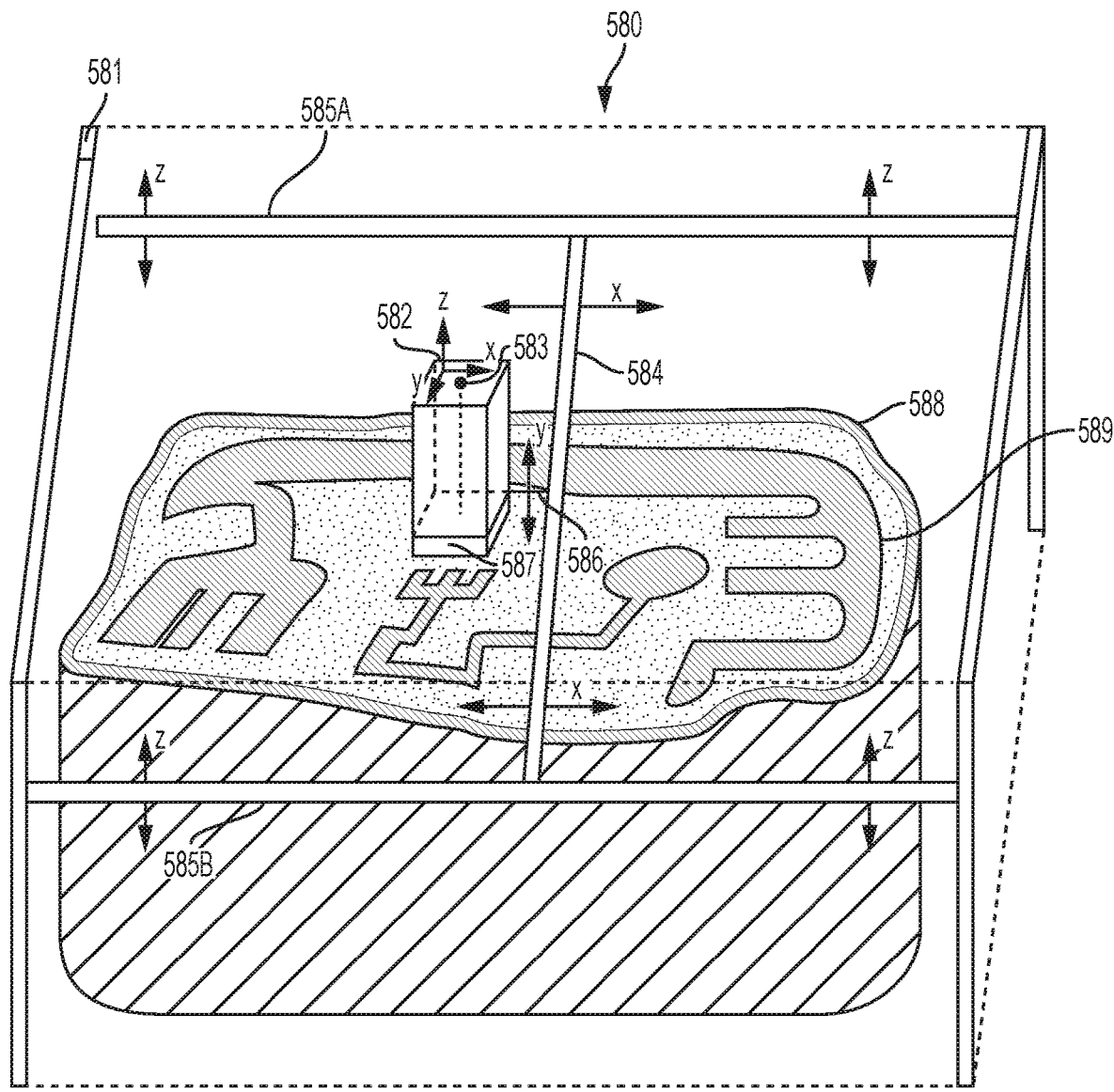
FIG. 5C shows an alternate example of an apparatus for carrying out some aspects of the present disclosure.

In some aspects, one or more of the additive manufacturing apparatuses 530 (shown in FIG. 5A as 530a, 530b, . . . 530n) may comprise an apparatus 580 as shown in FIG. 5C. The apparatus 580 comprises a positioning system 581; a build unit 582 comprising an irradiation emission directing device 583; a laminar gas flow zone 587; and a build plate (not shown in this view) beneath an object portion being built 589. The maximum build area is defined by the positioning system 581, instead of by a powder bed as with conventional systems, and the build area for a particular build can be confined to a build envelope 588 that may be dynamically built up along with the object. In this illustration of one embodiment of the invention, the positioning system 581 is a gantry, but the present invention is not limited to using a gantry. In general, the positioning system 581 used in the present invention may be any multidimensional positioning system such as a delta robot, cable robot, a robot arm, etc. The gantry 581 has an x crossbeam 584 that moves the build unit 582 in the x direction. There are two z crossbeams 585A and 585B that move the build unit 582 and the x crossbeam 584 in the z direction. The x cross beam 584 and the build unit 582 are attached by a mechanism 586 that moves the build unit 582 in the y direction. The irradiation emission directing device 583 may be independently moved inside of the build unit 582 by a second positioning system (not shown). In particular, the use of apparatus 580, in which the build area can be confined to build envelope 588, allows for use of larger build areas than may be feasible with apparatus 540 with powder bed 542.

The lasers may emit radiation at any wavelength suitable for use in additive printing methods, as will be known to those of skill in the art. In some embodiments, the at least two lasers emit different wavelengths of light. In some embodiments, the at least two lasers emit different powers of light. In some embodiments, the at least two lasers emit the same wavelength of light. In some embodiments, the at least two lasers emit the same power of light. The 3D model dictates the wavelengths and/or powers of light for each of the at least two lasers, and the computer and/or the controlling component control the wavelength and/or the power of each laser. In some embodiments, switching from a first wavelength and/or power of light to a second wavelength and/or power of light comprises switching from a first laser to a second laser.

Figure 6:
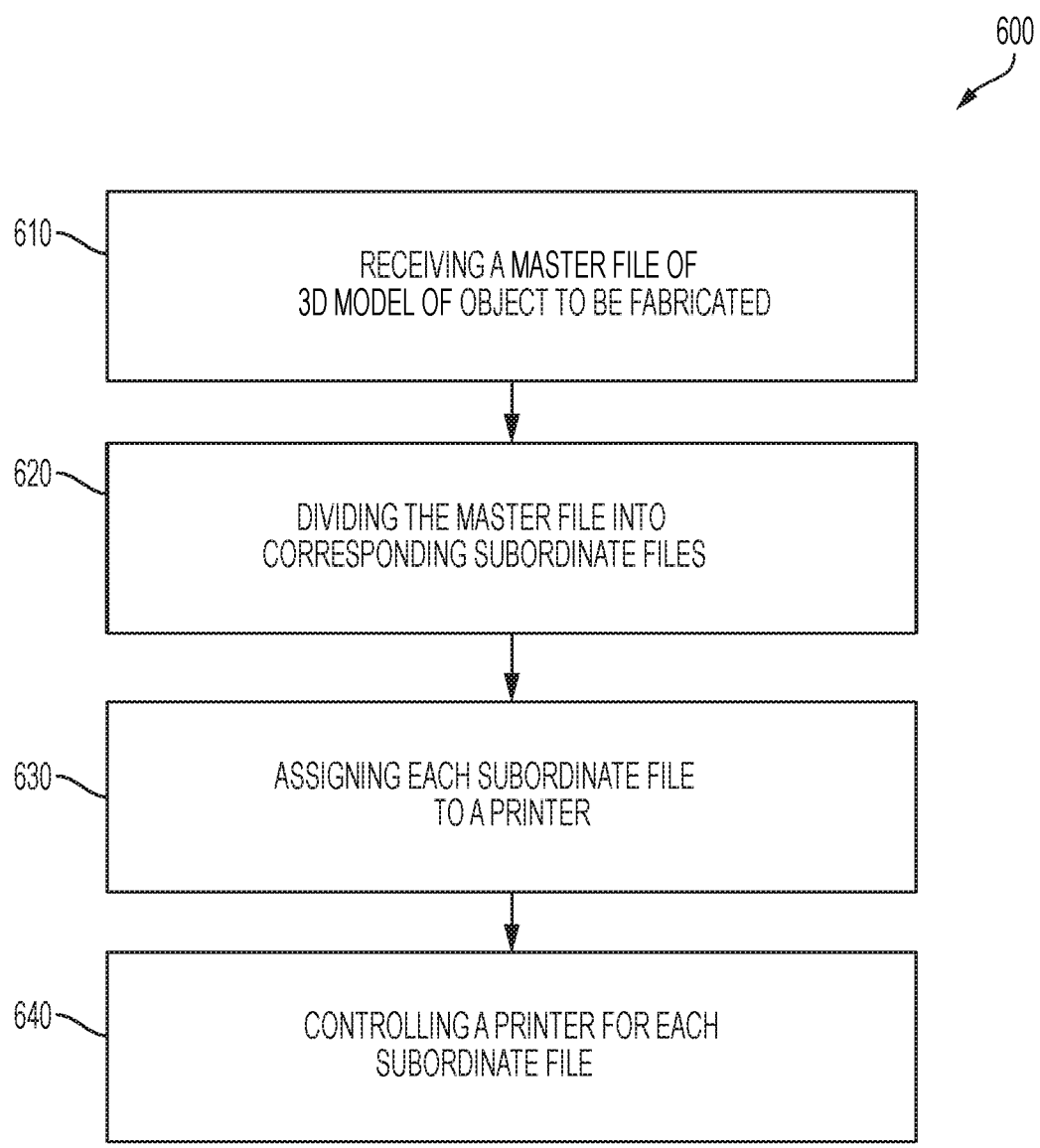
FIG. 6 illustrates a flowchart showing an exemplary method of manufacturing an object according to the present disclosure.

FIG. 6 is a flowchart illustrating an example method 600 of manufacturing an object in a series of portions. The method 600 is performed by a specially programmed computer (e.g., computer 510) including an alignment component 520. The specially programmed computer may further include an extension to the 3D model (e.g., CAD file) program that performs the method 600 or a separate program that controls the computer to perform the method 600. The computer program may be stored on a non-transitory computer-readable storage medium as computer executable code for controlling the computer 510 and/or the apparatus 540 and/or the apparatus 580. In an aspect, the computer 510 is communicatively coupled to an AM apparatus, such as the apparatus 540 or the apparatus 580. The additive manufacturing system 500 operates based on a three dimensional model of the object having a first scale, i.e., a model scale. The model of the object is oriented according to an x-y build plane corresponding to an orientation of a layer of the part and a z-axis orthogonal to the x-y build plane that defines an order of each layer of the part.

In block 610, the method 600 includes receiving a master file. For example, the computer 510 receives a master file 201 comprising a 3D model of an object to be fabricated.

In block 620, the method 600 includes dividing a master file into corresponding subordinate files defining corresponding portions of the object. For example, the master file 301 comprising a 3D model of the object may be divided into two or more subordinate files 303a-303n, each comprising a 3D model of a corresponding portion of the object. In some aspects, the master file 301 is divided into four or more subordinate files 303a-303n. In some aspects, the master file 301 is divided into ten or more subordinate files 303a-303n.

In block 630, the method 600 includes assigning each subordinate file to a printer. In an aspect, each subordinate file 303a-303n is assigned to a separate printer 203. Each printer 203 comprises at least one energy source (e.g., energy source 550). In some aspects, the energy sources 550 are laser beams 307a-307n. In some aspects, each subordinate file 303a-303n is assigned to at least two lasers 307a-307n. In some aspects, the at least two lasers 307a-307n are different lasers. In some aspects, the at least two lasers 307a-307n emit different wavelengths of light. In some aspects, the at least two lasers 307a-307n emit different powers. In some aspects, the at least two lasers 307a-307n emit the same wavelength of light. In some aspects the at least two lasers 307a-307n emit the same power. The master file 301 dictates the wavelengths and/or powers for each of the at least two lasers 307a-307n, and the computer 510 and/or the controlling component 522 control the wavelength and/or the power of each laser 307a-307n.

In block 640, the method 600 includes controlling a printer in accordance with a corresponding subordinate file. In an aspect, controlling a printer 203 comprises, for each subordinate file 303a-303n, controlling at least a first laser 307a to fabricate a corresponding portion 310a of the object to be fabricated. In some aspects, controlling a printer 203 comprises, for each subordinate file 303a-303n, controlling at least two lasers 307a-307n using a first subordinate file 303a, to fabricate a corresponding portion 310a.

Figure 7:
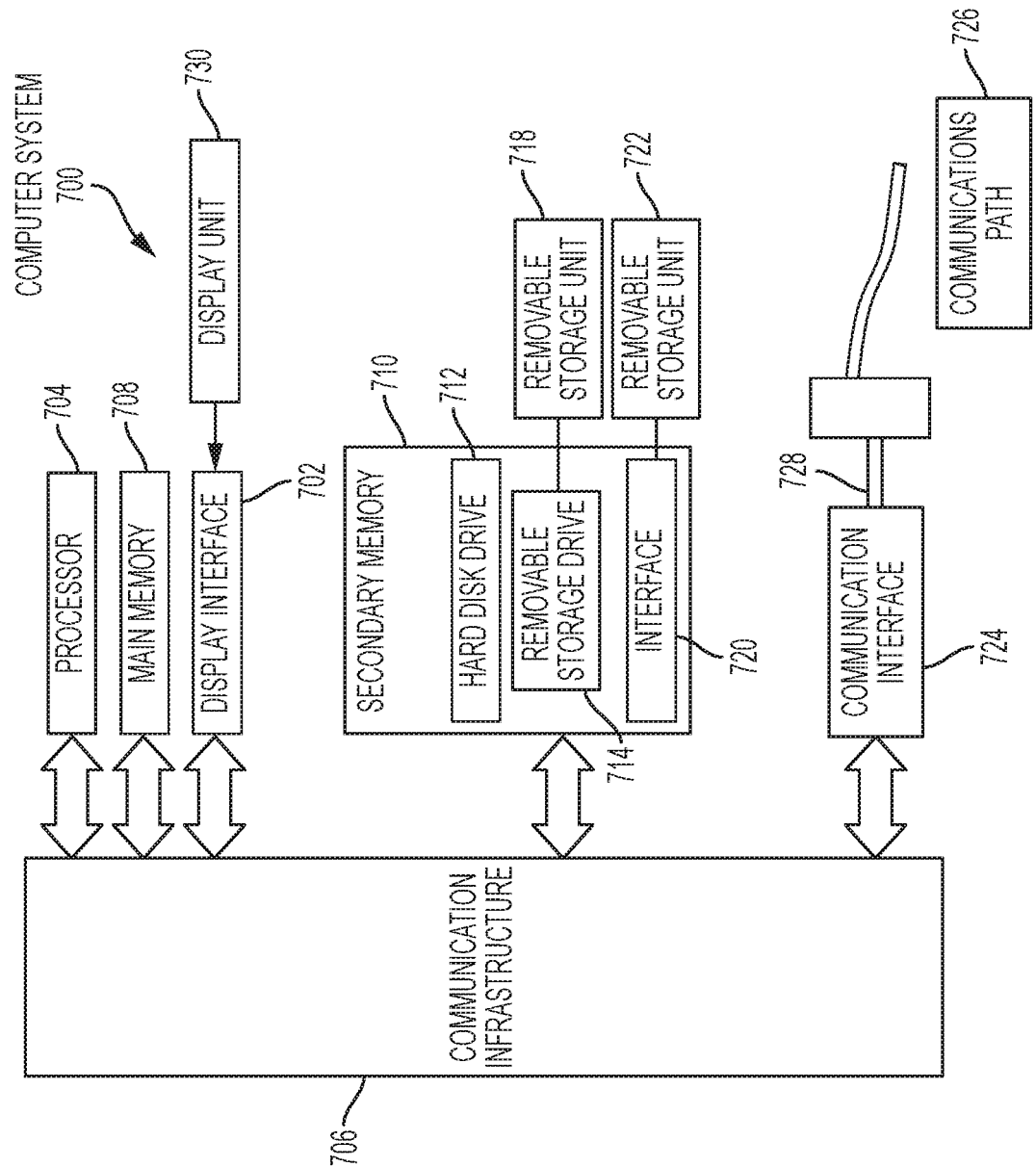
FIG. 7 illustrates various features of an example computer system for use in conjunction with aspects of the present disclosure.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 700 can include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712, and/or a removable storage drive 714, representing a floppy disk drive, a magnetic tape drive, an optical disk drive, a universal serial bus (USB) flash drive, etc. The removable storage drive 714 reads from and/or writes to a removable storage unit 718 in a well-known manner. Removable storage unit 718 represents a floppy disk, magnetic tape, optical disk, USB flash drive etc., which is read by and written to removable storage drive 714. As will be appreciated, the removable storage unit 718 includes a computer usable storage medium having stored therein computer software and/or data.

Alternative aspects of the present invention may include secondary memory 710 and may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 718, a hard disk installed in hard disk drive 712, and signals 728. These computer program products provide software to the computer system 700. Aspects of the present invention are directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features in accordance with aspects of the present invention, as discussed herein. In particular, the computer programs, when executed, enable the processor 704 to perform the features in accordance with aspects of the present invention. Accordingly, such computer programs represent controllers of the computer system 700.

In an aspect of the present invention where the invention is implemented using software, the software may be stored in a computer program product and loaded into computer system 700 using removable storage drive 714, hard drive 712, or communications interface 720. The control logic (software), when executed by the processor 704, causes the processor 704 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

In yet another aspect of the present invention, the invention may be implemented using a combination of both hardware and software.

Figure 8:
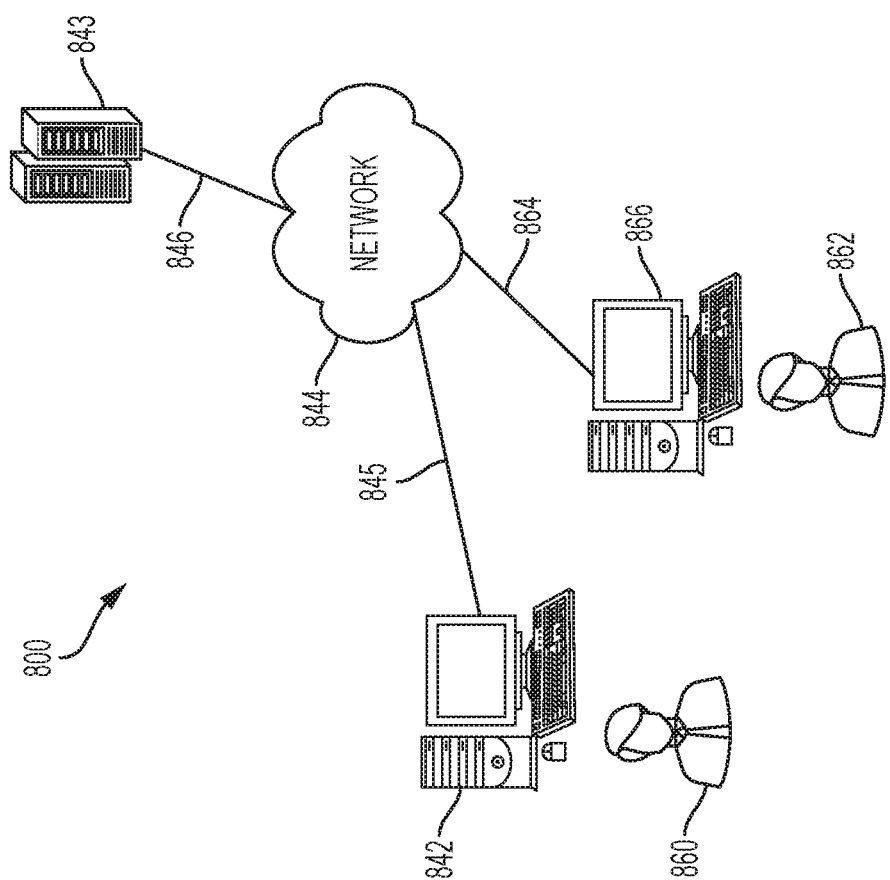
FIG. 8 illustrates an example system diagram of various hardware components and other features for use in accordance with aspects of the present disclosure.

FIG. 8 shows a communication system 800 usable in accordance with aspects of the present invention. The communication system 800 includes one or more accessors 860, 862 (also referred to interchangeably herein as one or more "users") and one or more terminals 842, 866. In one aspect of the present invention, data for use is, for example, input and/or accessed by accessors 860, 862 via terminals 842, 866, such as personal computers (PCs), minicomputers, mainframe computers, microcomputers, telephonic devices, or wireless devices, personal digital assistants ("PDAs") or a hand-held wireless devices (e.g., wireless telephones) coupled to a server 843, such as a PC, minicomputer, mainframe computer, microcomputer, or other device having a processor and a repository for data and/or connection to a repository for data, via, for example, a network 844, such as the Internet or an intranet, and/or a wireless network, and couplings 845, 846, 864. The couplings 845, 846, 864 include, for example, wired, wireless, or fiberoptic links. In another aspect of the present invention, the method and system of the present invention may include one or more features that operate in a stand-alone environment, such as on a single terminal.

The methods and systems described herein may be used with any powder-based build material suitable for use in additive printing, as will be known to those of skill in the art. In some embodiments, the build material is cobalt chrome.

The methods and systems of the present disclosure may be used in conjunction with powder-based additive printing methods known in the art. In some embodiments, the present disclosure is related to a method of fabricating an object using direct metal laser melting (DMLM). In some aspects, the methods and systems of the present disclosure may be used in conjunction with DMLM methods comprising building at least one layer of a chamber wall, providing a layer of powder within the at least one layer of a chamber wall by passing a recoater arm over the layer of powder, irradiating the layer of powder to form a fused region, and then repeating until the object is formed within the chamber wall.

In an aspect, the present invention relates to the parallelized additive methods and systems, as well as non-transitory computer-readable storage mediums related to the same, of the present invention incorporated or combined with features of other powder bed additive manufacturing methods and systems. The following patent applications include disclosure of these various aspects and their use:

U.S. patent application Ser. No. 15/406,467, titled "Additive Manufacturing Using a Mobile Gasflow Area,", and filed Jan. 13, 2017.

U.S. patent application Ser. No. 15/406,454, titled "Additive Manufacturing Using a Mobile Scan Area,", and filed Jan. 13, 2017.

U.S. patent application Ser. No. 15/406,444, titled "Additive Manufacturing Using a Dynamically Grown Wall,", and filed Jan. 13, 2017.

U.S. patent application Ser. No. 15/406,461, titled "Additive Manufacturing Using a Selective Recoater,", and filed Jan. 13, 2017.

U.S. patent application Ser. No. 15/406,471, titled "Large Scale Additive Machine,", and filed Jan. 13, 2017.

The disclosures of these applications are incorporated herein in their entirety to the extent that they discloses additional aspects of powder bed additive manufacturing methods and systems and computer-readable storage mediums that can be used in conjunction with those disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of fabricating an object, comprising:
   printing a first portion of an object using a first printing machine, the first printing machine comprising at least a first beam source and the first printing machine being controlled according to a first subordinate file, and the at least a first beam source melting or sintering a first portion of a powder bed corresponding to the first portion of the object; and
   printing a second portion of the object using a second printing machine, the second portion of the object being printed by the second printing machine at least partly in parallel with the first portion of the object being printed by the first printing machine, the second printing machine comprising at least a second beam source and the second printing machine being controlled according to a second subordinate file, and the at least a second beam source melting or sintering a second portion of the powder bed corresponding to the second portion of the object, wherein the first portion of the object and the second portion of the object are printed from the powder bed;
   the first subordinate file and the second subordinate file having been divided from a master file comprising a 3D model of the object, the first subordinate file comprising a 3D model of the first portion of the object and the second subordinate file comprising a 3D model of the second portion of the object.

2. The method of claim 1, comprising:
   processing the first subordinate file and the second subordinate file at least partly in parallel.

3. The method of claim 1, comprising:
   dividing the first subordinate file and the second subordinate file from the master file comprising the 3D model of the object, wherein printing the first portion according to the first subordinate file and printing the second portion according to the second subordinate file integrally forms at least a part of the object.

4. The method of claim 1, comprising:
   assigning the first subordinate file to the first additive manufacturing machine and/or assigning the second subordinate file to the second additive manufacturing machine.

5. The method of claim 1, comprising:
   controlling the first printer according to the first subordinate file and/or controlling the second printer according to the second subordinate file.

6. The method of claim 1, wherein the first printing machine is configured to emit a first beam and at least a first additional beam, and wherein printing the first portion of the object comprises:
   causing the first printing machine to emit the first beam and the first additional beam being according to the first subordinate file; and/or
   wherein the second printing machine is configured to emit a second beam and at least a second additional beam, and wherein printing the second portion of the object comprises:
   causing the second printing machine to emit the second beam and the second additional beam according to the second subordinate file at least partly in parallel with the first portion of the object being printed by the first printing machine.

7. The method of claim 6, wherein the first beam differs from the first additional beam in respect of wavelength, power, and/or intensity; and/or wherein the second beam differs from the second additional beam in respect of wavelength, power, and/or intensity.

8. The method of claim 1, wherein the master file comprises a .STL file corresponding to the 3D model, and/or wherein the master file comprises g-code corresponding to the 3D model.

9. An additive manufacturing system, comprising:
a first additive manufacturing machine comprising at least a first laser;
a second additive manufacturing machine comprising at least a second laser;
a build plate configured to support a powder bed;
a memory comprising:
a first subordinate file comprising a 3D model of a first portion of an object; and
a second subordinate file comprising a 3D model of a second portion of the object, the first subordinate file and the second subordinate file having been divided from a master file comprising a 3D model of the object; and
one or more processors operably configured to:
print the first portion of the object using a first printing machine, the first printing machine being controlled according to the first subordinate file, and the at least a first laser melting or sintering a first portion of the powder bed corresponding to the first portion of the object; and
print the second portion of the object using a second printing machine, the second portion of the object being printed by the second printing machine at least partly in parallel with the first portion of the object being printed by the first printing machine, the second printing machine being controlled according to the second subordinate file, and the at least a second laser melting or sintering a second portion of the powder bed corresponding to the second portion of the object, and wherein the first portion of the object and the second portion of the object are printed from the powder bed.

10. The additive manufacturing system of claim 9, wherein the one or more processors are configured to:
process the first subordinate file and the second subordinate file at least partly in parallel.

11. The additive manufacturing system of claim 9, wherein the one or more processors are configured to:
divide the first subordinate file and the second subordinate file from the master file comprising the 3D model of the object, wherein printing the first portion according to the first subordinate file and printing the second portion according to the second subordinate file integrally forms at least a part of the object.

12. The additive manufacturing system of claim 9, wherein the one or more processors are configured to:
assign the first subordinate file to the first additive manufacturing machine and/or assign the second subordinate file to the second additive manufacturing machine.

13. The additive manufacturing system of claim 9, wherein the one or more processors are configured to:
control the first printer according to the first subordinate file and/or control the second printer according to the second subordinate file.

14. The additive manufacturing system of claim 9, wherein the first additive manufacturing machine and/or the second additive manufacturing machine comprise:
a direct metal laser melting (DMLM) machine;
a selective laser melting (SLM) machine; or
a digital light processing (DLP) machine.

15. The additive manufacturing system of claim 1, wherein the first printing machine is configured to emit a first beam and at least a first additional beam, and wherein print the first portion of the object comprises:
cause the first printing machine to emit the first beam and the first additional beam being according to the first subordinate file; and/or
wherein the second printing machine is configured to emit a second beam and at least a second additional beam, and wherein print the second portion of the object comprises:
cause the second printing machine to emit the second beam and the second additional beam according to the second subordinate file at least partly in parallel with the first portion of the object being printed by the first printing machine.

16. The additive manufacturing system of claim 6, wherein the first beam differs from the first additional beam in respect of wavelength, power, and/or intensity; and/or wherein the second beam differs from the second additional beam in respect of wavelength, power, and/or intensity.

17. A non-transitory computer-readable medium comprising computer-executable instructions, which when executed by a processor associated with an additive manufacturing system, cause the additive manufacturing system to:
print a first portion of an object using a first printing machine, the first printing machine comprising at least a first laser and the first printing machine being controlled according to a first subordinate file, and the at least a first laser melting or sintering a first portion of a powder bed corresponding to the first portion of the object; and
print a second portion of the object using a second printing machine, the second portion of the object being printed by the second printing machine at least partly in parallel with the first portion of the object being printed by the first printing machine, the second printing machine comprising at least a second laser and the second printing machine being controlled according to a second subordinate file, and the at least a second laser melting or sintering a second portion of the powder bed corresponding to the second portion of the object, wherein the first portion of the object and the second portion of the object are printed from the powder bed;
the first subordinate file and the second subordinate file having been divided from a master file comprising a 3D model of the object, the first subordinate file comprising a 3D model of the first portion of the object and the second subordinate file comprising a 3D model of the second portion of the object.

18. The non-transitory computer-readable medium of claim 17, comprising computer-executable instructions, which when executed by the processor associated with the additive manufacturing system, cause the additive manufacturing system to:
process the first subordinate file and the second subordinate file at least partly in parallel.

19. The non-transitory computer-readable medium of claim 17, comprising computer-executable instructions, which when executed by the processor associated with the additive manufacturing system, cause the additive manufacturing system to:
divide the first subordinate file and the second subordinate file from the master file comprising the 3D model of the object.

* * * * *